(12) United States Patent
Sutton et al.

(10) Patent No.: US 6,502,502 B1
(45) Date of Patent: Jan. 7, 2003

(54) TOASTER RACK SYSTEM

(75) Inventors: Timothy B. Sutton, St. Joseph, MI (US); Arlene Richardson, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 08/946,424

(22) Filed: Oct. 7, 1997

Related U.S. Application Data

(60) Provisional application No. 60/029,218, filed on Oct. 29, 1996.

(51) Int. Cl.$^7$ ................................................ A47J 37/08
(52) U.S. Cl. ...................... 99/391; 99/329 P; 99/385; 99/389
(58) Field of Search .......................... 99/326–333, 385, 99/389–391, 393, 399, 400, 401; 219/521, 492, 494, 497, 518

(56) References Cited

U.S. PATENT DOCUMENTS

| | | | | |
|---|---|---|---|---|
| 4,290,349 A | * | 9/1981 | Fiorenza | 99/388 |
| 4,577,550 A | * | 3/1986 | Maroti et al. | 99/329 RT |
| 4,745,855 A | * | 5/1988 | Younger | 99/391 |
| 5,072,662 A | * | 12/1991 | Yip | 99/327 |
| 5,121,678 A | * | 6/1992 | Del Fresno | 99/393 X |
| 5,181,455 A | * | 1/1993 | Masel et al. | 99/389 X |
| 5,216,944 A | * | 6/1993 | Trujillo | 99/385 X |
| 5,309,826 A | * | 5/1994 | Ortiz | 219/521 X |
| 5,317,960 A | * | 6/1994 | Cumfer | 99/399 X |
| 5,423,246 A | * | 6/1995 | McNair et al. | 99/334 |
| 5,487,328 A | * | 1/1996 | Fujii | 99/390 |
| 5,642,657 A | * | 7/1997 | Yeung | 99/334 |
| 5,664,481 A | * | 9/1997 | Huggler | 99/328 |

* cited by examiner

*Primary Examiner*—Timothy F. Simone
(74) *Attorney, Agent, or Firm*—Robert O. Rice; Stephen D. Krefman; Thomas J. Roth

(57) ABSTRACT

A toaster having a heating enclosure including a first support wall and a second support wall extending outwardly from a base. A pair of opposed racks extend between the first and second support walls along the sides of the heating enclosure. Each rack has a bottom edge hingedly supported by the support walls and a top edge wherein the top edges are biased toward each other. The racks have one end rotatably supported by a plastic bearing and are biased along their axis of rotation against the bearing to provide smooth and quiet rotation. A toast carriage extends from a plastic arm hub which is slidingly supported adjacent the second support wall between an upper and lower limit position. The arm hub includes a plurality of bearing arms slidingly engaging a portion of the racks extending outside of the heating enclosure wherein in upper limit position the bearing arms separate the top edges of the rack a first predetermined distance apart and in the lower limit position the top edges of the racks are separated a second predetermined distance apart.

18 Claims, 3 Drawing Sheets

TOASTER RACK SYSTEM

This application claims benefit of provisional appln Ser. No. 60/029218 filed Oct. 29, 1996.

BACKGROUND OF THE INVENTION

This invention relates to an electric toaster and in particular to a rack system for a toaster.

In a conventional toaster, a toasting enclosure having an open top is provided for receiving bread items for toasting. Typically, a toast carriage is provided in the enclosure slidable in a guide between an upper and a lower limit position and biased toward the upper limit position. To operate the toaster, bread items are placed in the upper portion of the enclosure supported by the toast carriage and then lowered fully into the enclosure by manually moving a handle connected to the toast carriage. The toast carriage is engaged in the lower limit position while the bread item is toasted. When the toasting operation is complete, the toast carriage is released and returned to the upper limit position raising the bread item for easy removal.

Some highly featured toasters include wire racks disposed along the sides of the toasting enclosure which pivot about their bottom edges and close together on a bread item when the toast carriage is lowered. The wire racks operate to center and hold bread items upright in the toasting enclosure for optimum toasting.

Unfortunately, many prior wire rack systems for clamping bread items give the impression of low quality because of their relatively noisy operation. Moreover, previous rack systems have included components which rattle and give the impression of poor quality when the toaster is moved. These impressions of poor quality are the result, in part, of sliding contact between metallic parts which are assembled in a relatively loose and unsecured manner.

Another disadvantage of the prior art clamping wire rack systems are their relative complexity and the corresponding difficulty in assembling these systems. This complexity increases failure rates and adds to the impression of poor quality.

SUMMARY OF THE INVENTION

The present invention offers an improvement over the prior art by providing a toaster which includes a clamping wire rack system which operates in a relatively smooth and quiet manner.

Further, the present invention provides a clamping wire rack system in a toaster which is relatively inexpensive and easy to assemble. The present invention provides a toaster having a base supporting an inner chassis which form a heating enclosure. The inner and outer chassis includes a first support wall and a second support wall extending outwardly from the base. A pair of opposed racks extend between the first and second support walls along the sides of the heating enclosure. Each rack has a bottom edge and a top edge wherein the bottom edges are hingedly supported by the support walls and the top edges are biased toward each other. The racks are rotatably supported by a plastic bearing and are biased along their axis of rotation to provide smooth and quiet rotation.

According to another aspect of the present invention, a slider rod extends from a control end of the base outside of the heating enclosure adjacent the second support wall. A plastic arm hub is slidingly supported by the slider rod and supports a toast carriage which extends longitudinally through the heating enclosure. The arm hub and toast carriage form an assembly which is slidable between an upper and lower limit position. The arm hub includes a plurality of bearing arms slidingly engaging the racks wherein in the upper limit position the bearing arms separate the top edges of the rack a first predetermined distance and in the lower limit position the top edges of the racks are separated a second predetermined distance.

DESCRIPTION OF THE PREFERRED EMBODIMENT

Figure 1:
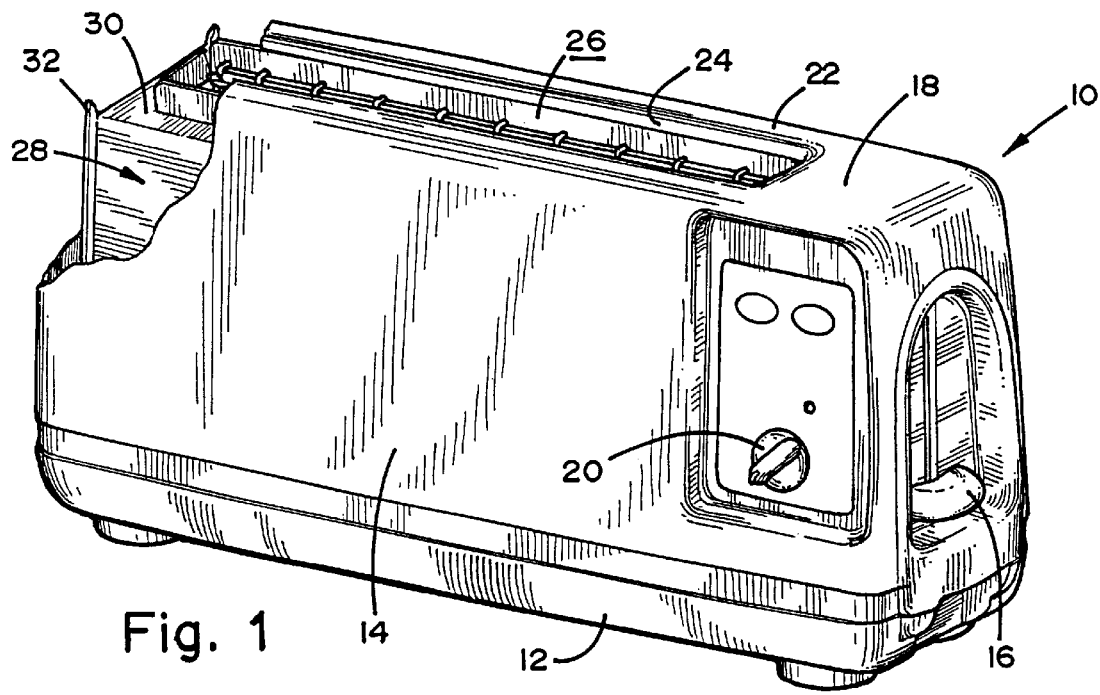
FIG. 1 is a partially cut-away perspective view of a toaster embodying the present invention.

Referring now to FIG. 1, there is shown an electric toaster 10 having a base 12 and an outer shell 14. A manually operated handle 16 extends from a control end 18 of the toaster. Controls 20 allow the user of the toaster to selectively control the toasting operation.

The outer shell 14 includes a top surface 22 having an opening 24 for accessing a toasting region 26. The toasting region 26 is defined by an inner chassis 28 comprising a U-shaped upper chassis member 30 and a U-shaped lower chassis member 32. The chassis members assemble together to form a heating enclosure having means (not shown) for toasting bread items therein.

Figure 2:
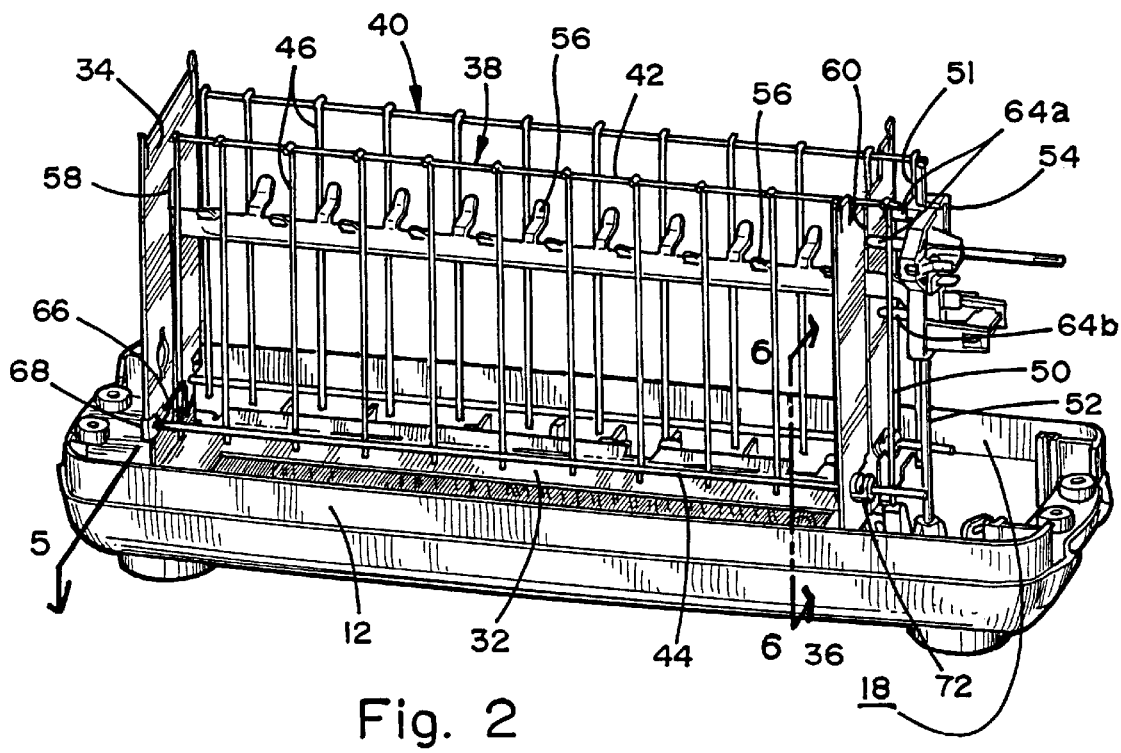
FIG. 2 is a perspective view of the toaster of FIG. 1 having the cover and upper chassis member removed and the toast carriage in it upper limit position.

FIG. 2 illustrates the toaster 10 with the shell 14, upper chassis member 30 and various other components removed. The lower chassis member 32 includes a first support wall 34 and a second support wall 36 extending away from the base 12. The toasting region 26 is defined between the support walls 34 and 36. The region of the toaster 10 outside of the toasting region 26 just beyond the second support wall 36 is referred to as the control end region 18.

Figures 3, 4:
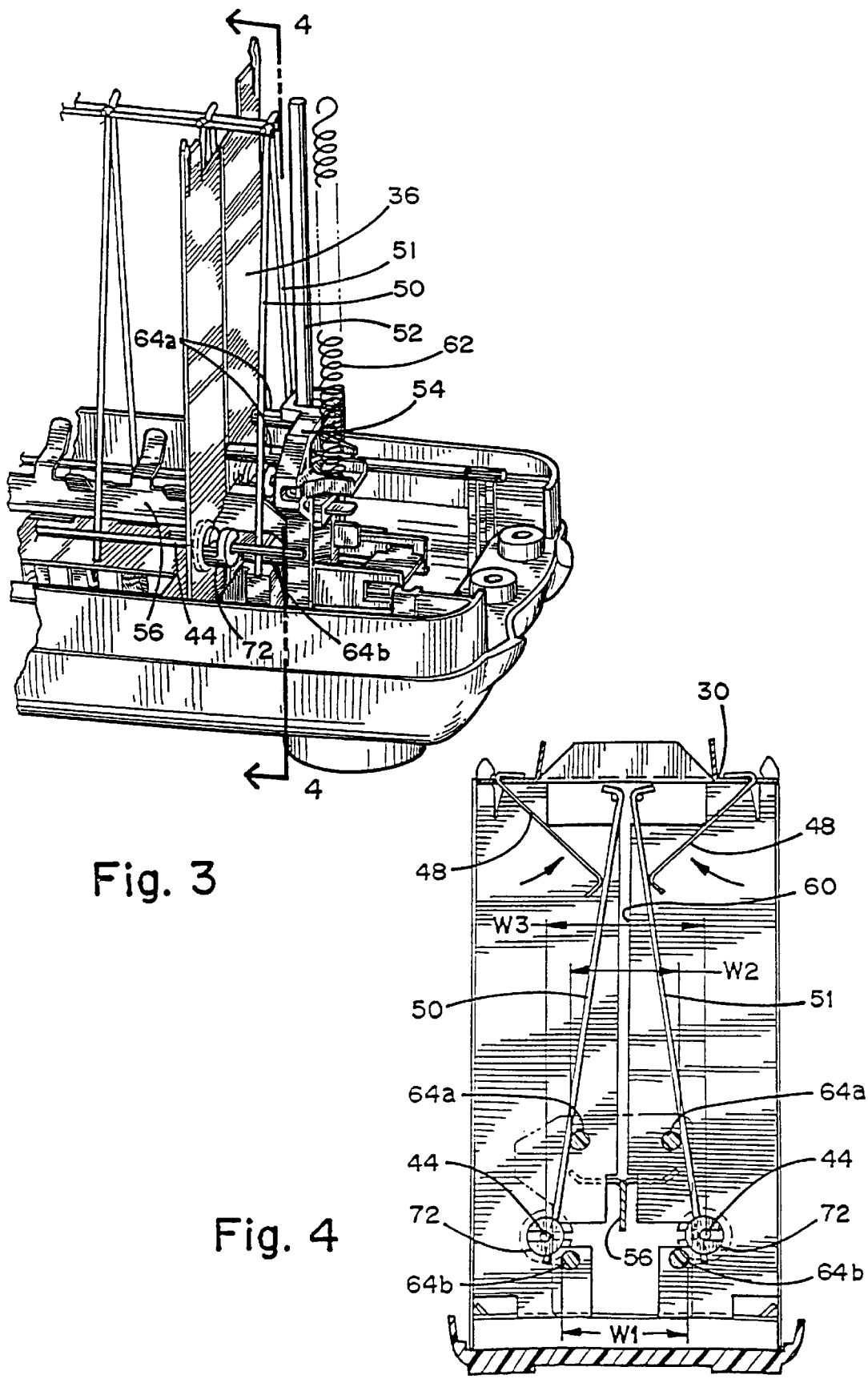
FIG. 3 is an enlarged perspective view of the right-hand portion of the toaster of FIG. 2 having the toast carriage in it lower limit position.
FIG. 4 is sectional view taken along lines 4—4 of FIG. 3.

A pair of wire racks 38 and 40 are supported along the sides of the toasting region. Each rack includes a top wire 42, a bottom wire 44 and a plurality of vertical wires 46 extending between the top wire 42 and the bottom wire 44. The bottom wire of each of the racks is hingedly supported by the support walls 34 and 36 such that the racks may pivot about the bottom wire. In addition to extending between the support walls 34 and 36, a portion of each rack 38 and 40 extends beyond the second support wall 36 such that vertical control wires 50, 51 for each rack, respectively, are supported in the control end region 37 of the toaster 10. FIG. 4 shows that the bottom wires 44 are positioned by the support walls 34 and 36 a distance W3 apart. A spring 48 is provided for each rack, extending from the upper chassis member 30, for engaging a vertical wire of the rack and biasing the top of each rack to rotate inwardly, toward the opposing rack.

Referring now to FIG. 2 in combination with FIGS. 3 and 4, it can be seen that a slider rod 52 extends from the base 12 in the control end region 18. An arm hub 54 is slidingly disposed on the slider rod 52 and supports a toast carriage 56 which extends longitudinally in the toasting region 26. The arm hub 54 and toast carriage 56 form an assembly which is slidable between an upper and lower limit position. The toast carriage 56 is guided in slots 58 and 60 provided on the support walls 34 and 36, respectively. An extension spring 62 extending between the upper chassis member 30 and the arm hub 54 biases the toast carriage 56 toward the upper limit position. The handle 16 mounts to the handle shaft 53, which extends from the arm hub 54 and provides a means for manually moving the toast carriage into the lower limit position.

During toaster operation, bread items are placed on the toast carriage 56 which is manually moved into its lower limit position. Means (not shown) are provided for securing the arm hub 54 in the lower limit position during the toasting operation and releasing the arm hub 54 to return the toast carriage 56 to the upper limit position when the bread item is properly toasted.

The racks 38 and 40 are controlled to be in an open position to receive bread items when the toast carriage 56 is in the upper limit position and to close or clamp bread items when the carriage 56 is in the lower limit position. To accomplish this operation, the arm hub 54 includes a plurality of bearing arms 64 extending outwardly from the arm hub 54 toward the second support wall 36 for slidingly engaging the control wires 50 and 51. The bearing arms 64 are arranged into an upper pair 64a and a lower pair 64b having a dimension W1 (FIG. 4) between the outer edges of the lower bearing arms 64b which is greater than a dimension W2 (FIG. 4) between the outer edges of the upper bearing arms 64a.

While the arm hub 56 is shown as a unitary plastic body with bearing arms 64a and 64b, it can be understood by one skilled in the art that the arm hub 56 may be fabricated from a plurality of parts and may provide bearing surfaces for engaging the wire racks without utilizing the arm type structures described here in the preferred embodiment.

As mentioned above, the spring 48 bias the top edge of each rack 38 and 40 to rotate toward each other. However, when the arm hub/toast carriage assembly is in the upper limit position, the lower bearing arms 64b engage the control wires 50 and 51 for separating the top edges of the racks 38 and 40 a first predetermined distance apart equal to the distance W1. When the toast carriage is manually lowered toward the lower limit position, the lower bearing arms 64b slidingly move downwardly along the control wires 50 and 51. Since the dimension W3 between the opposed bottom wires 44 is greater than the dimension W1, as the arm hub 54 is lowered the wire racks 38 and 40 pivot toward each other under the bias exerted by spring 48. As the arm hub 56 approaches its lower limit position, the upper bearing arms 64a engage the control wires 50 and 51 and the lower bearing arms 64b separate from the control wires. The relationship between the dimension W2 and dimension W3 is such that when the arm hub 54 is in its lower limit position, the upper edges of the wire racks are held a second predetermined distance apart such that wire racks 38 and 40 do not contact each other.

In this manner, the lower bearing arms 64b provide outer bearing surfaces for separating the wire racks when the arm hub 54 is in the upper limit position and the upper bearing arms 64a provide inner bearing surfaces for limiting inward rotation of the wire racks when the arm hub 54 is in the lower limit position.

During movement between the upper and lower limit positions, the wire racks are controlled by the sliding contact between the plastic bearing arms 64 and the control wires 50, 51. This plastic on metal contact results in a relatively quiet, smooth rack operation. Moreover, by preventing the wire racks from contacting each other when the arm hub 54/carriage arm 56 assembly is in the lower limit position, undesirable noises are prevented which would otherwise result from contact between the wire racks. Generally, metallic control elements are viewed as necessary due to the high temperatures which occur within the toasting enclosure during the toasting operation. However, since the control wires 50 and 51 extend beyond the heating enclosure, a plasticor non-metalic arm hub is feasible.

The racks 38 and 40 are also rotatably supported in a manner to provide a secured, biased assembly which minimize rattles and provides for quiet, smooth rack rotation. The first support wall 34, as shown in FIG. 4, rotatably supports the bottom wire 44 by having one end of the bottom wire 44 extend through a hole 66 provided in the support wall 34. A spring clip 68 attaches to the support wall 34 adjacent the hole 66 and engages the end of the bottom wire 44 to bias the bottom wire in the direction labeled 70. In this manner, the racks are preloaded to prevent them from rattling.

Figure 5:
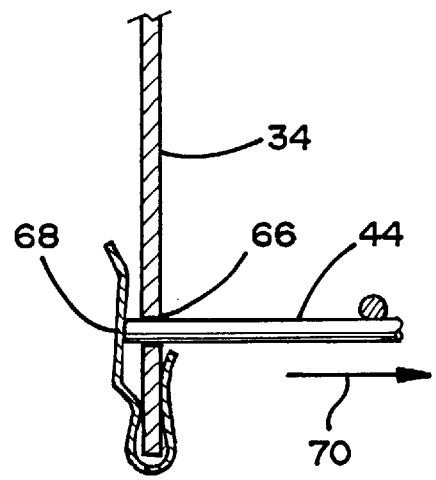
FIG. 5 is an enlarged sectional view taken along lines 5—5 of FIG. 2.
Figure 6:
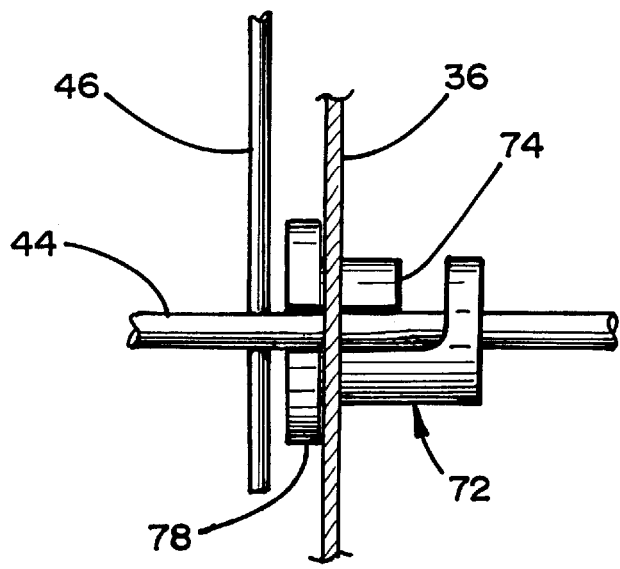
FIG. 6 is an enlarged sectional view taken along lines 6—6 of FIG. 2.
Figure 7:
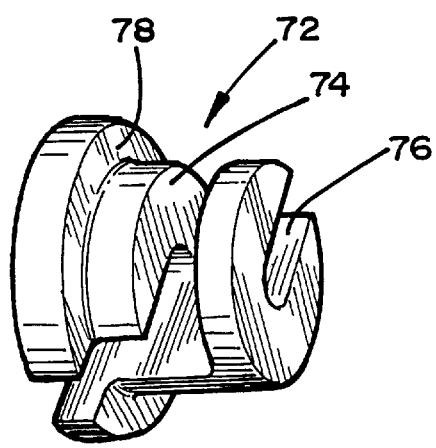
FIG. 7 is a perspective view of the wire rack bearing of the present invention.

On the opposite end of the rack, the second support wall 36 includes a cut-out area 71 (FIGS. 2 and 3) for receiving a phenolic bearing 72 which rotatably supports the bottom wire 44, as shown in FIGS. 5 and 6. The bearing 72 includes a radial slot 74 and an axial slot 76 such that it may be easily assembled to the bottom wire between a pair of vertical wires 46. A bearing flange portion 78 of the bearing 72 is disposed adjacent the support wall 36 when the bearing is assembled to the support wall. Under the bias of the spring clip 68, the vertical wire 46 adjacent the bearing 72 is pushed against the bearing flange portion 78. In this manner, contact between the wire racks 38 and 40 and the support walls 34 and 36 is prevented and the wire racks are supported in manner to provide smooth, quiet rotation.

It can be seen, therefore, that the present invention provides a unique wire rack clamping system for a toaster which operates in a quiet and smooth manner. Although the present invention has been described with reference to a specific embodiment, those of skill in the Art will recognize that changes may be made thereto without departing from the scope and spirit of the invention as set forth in the appended claims.

We claim:

1. A toaster comprising:
   a base;
   a first support wall extending from the base;
   a second support wall extending from the base;
   a pair of racks extending between the first and second support walls, each rack having a bottom edge and a top edge wherein the bottom edges are hingedly supported by the support walls and the top edges are biased toward each other;
   a hub post extending from the base;
   a arm hub slidingly supported by the hub post such that the arm hub can be positioned in an upper limit position away from the base and a lower limit position adjacent the base, the arm hub having a plurality of outer bearing surfaces for engaging the racks such that in the upper limit position the bearing surfaces separate the top edges of the rack and in the lower limit position the top edge of the racks are free to pivot toward each other.

2. The toaster according to claim 1, further wherein the arm hub further comprises a plurality of inner bearing surfaces for limiting the rotation of the racks when the arm hub is in the lower limit position.

3. The toaster according to claim 2 wherein the inner and outer bearing surfaces of the arm hub are provided on a plurality of bearing arms.

4. The toaster according to claim 1, further wherein the first and second support walls define between them a toast region and further wherein the arm hub is slidingly supported outside the toast region and each of the racks include a portion extending beyond the toast region such that the arm hub engages the racks outside the toast region.

5. The toaster according to claim 1, further wherein
   the first and second support walls define between them a toast region, and
   each of the racks further comprise a top wire, a bottom wire, and a plurality of vertical wires extending between the top and bottom wire,
   wherein the bottom wire is hingedly supported by the support walls such that at least one vertical wire on each rack is disposed outside of the toast region adjacent the arm hub, the plurality of outer bearing surfaces of the arm hub engaging the at least one vertical wire outside of the toast region.

6. The toaster according to claim 1, further wherein
   the first and second support walls define between them a toast region, and
   each of the opposed racks further comprises a top wire, a bottom wire, and a plurality of vertical wires extending between the top and bottom wire including a control wire, wherein a portion of each top and bottom wire extends beyond the second support wall such that the control wire on each rack is disposed outside of the toast region adjacent the arm hub,
   the toaster further comprising:
      a pair of bearings mounted to the second support wall, each bearing rotatably supporting the bottom wire of one of the racks, each bearing having a bearing flange; and
      a pair of spring clips connected to the first support wall for biasing each of the racks toward second support wall.

7. The toaster according to claim 1, further comprising:
   a pair of bearings mounted to the second support wall, each bearing rotatably supporting one of the racks; and
   means for biasing each of the racks toward second support wall.

8. A toaster comprising:
   a base;
   a first support wall extending from the base;
   a second support wall extending from the base wherein a toast region is defined between the first and second support walls;
   a pair of racks extending opposite of each other between the first and second support walls, each rack having a bottom edge and a top edge wherein the bottom edges are hingedly supported near the base and the top edges are biased toward each other, each rack further having a control wire extending outside of the toast region; and
   an arm hub slidingly supported adjacent the control wires wherein the arm hub can be positioned in an upper limit position and a lower limit position, the arm hub having a plurality of bearing surfaces for engaging the control wire of each rack for controlling the rotation of the racks about their bottom edges.

9. The toaster according to claim 8, further wherein the plurality of bearing surfaces comprise:
   a plurality of outer bearing surfaces for engaging the control wires of the racks such that in the upper limit position the bearing surfaces separate the top edges of the rack and in the lower limit position the top edge of the racks are free to pivot toward each other; and
   a plurality of inner bearing surfaces for engaging the control wires of the racks for limiting the rotation of the racks when the arm hub is in the lower limit position.

10. The toaster according to claim 8, further wherein the plurality of bearing surfaces engage the racks such that in the upper limit position the top edges of the rack are separated a first predetermined distance apart and in the lower limit position the top edges of the racks are separated a second predetermined distance apart.

11. The toaster according to claim 8, further wherein
   each of the racks further comprise a top wire, a bottom wire, and a plurality of vertical wires extending between the top and bottom wire, the control wire being a vertical wire extending between the top wire and bottom wire outside of the toast region.

12. The toaster according to claim 11, further comprising:
   a pair of bearings mounted to the second support wall, each bearing rotatably supporting the bottom wire of one of the racks, each bearing having a bearing flange; and
   a pair of spring clips connected to the first support wall for preloading each of the racks against the associated bearing flange.

13. The toaster according to claim 8, further comprising:
   a pair of bearings mounted to the second support wall, each bearing rotatably supporting one of the racks; and
   means for biasing each of the racks toward second support wall.

14. A toaster comprising:
   a base;
   a first support wall extending from the base;
   a second support wall extending from the base wherein a toast region is defined between the first and second support walls;

a pair of racks extending opposite each other between the first and second support walls, each rack having a bottom edge and a top edge wherein the bottom edges are hingedly supported and the top edges are biased toward each other; and a plastic arm hub slidingly supported adjacent the second support wall wherein the arm hub can be positioned in an upper limit position away from the base and a lower limit position adjacent the base, the arm hub having a plurality of bearing surfaces for engaging the racks such that in the upper limit position the top edges of the rack are separated a first predetermined distance apart and in the lower limit position the top edges of the racks are separated a second predetermined distance apart.

15. The toaster according to claim 14, further comprising:

an upper chassis member extending substantially between the first and second support walls and forming an enclosure with the support walls which defines the toast region; and a pair of springs extending from the upper chassis member, each spring engaging one of the racks for biasing the top edges of the racks toward each other.

16. The toaster according to claim 14, further wherein the plurality of bearing surfaces comprise:

a plurality of outer bearing surfaces for engaging the racks such that in the upper limit position the bearing surfaces separate the top edges of the rack a first predetermined distance apart; and a plurality of inner bearing surfaces for limiting the rotation of the racks such that when the arm hub is in the lower limit position the top edges of the racks are separated a second predetermined distance apart.

17. The toaster according to claim 14, further wherein a portion of each of the racks extends beyond the second support wall such that the arm hub engages the racks outside the toast region.

18. The toaster according to claim 14, further comprising:

a pair of bearings mounted to the second support wall, each bearing rotatably supporting one of the racks; and means for preloading the racks against the bearings to prevent the racks from rattling.

* * * * *